US012647265B2

(12) United States Patent
Dirnberger

(10) Patent No.: US 12,647,265 B2
(45) Date of Patent: Jun. 2, 2026

(54) METHOD IN A SECURE ELEMENT

(71) Applicant: GIESECKE+DEVRIENT MOBILE SECURITY GERMANY GMBH, Munich (DE)

(72) Inventor: Wolfgang Dirnberger, Baldham (DE)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 138 days.

(21) Appl. No.: 18/682,702

(22) PCT Filed: Aug. 9, 2022

(86) PCT No.: PCT/EP2022/025368
§ 371 (c)(1),
(2) Date: Feb. 9, 2024

(87) PCT Pub. No.: WO2023/016669
PCT Pub. Date: Feb. 16, 2023

(65) Prior Publication Data
US 2024/0283646 A1 Aug. 22, 2024

(30) Foreign Application Priority Data
Aug. 10, 2021 (DE) .................... 10 2021 004 115.1

(51) Int. Cl.
*H04L 9/14* (2006.01)
(52) U.S. Cl.
CPC ..................................... *H04L 9/14* (2013.01)
(58) Field of Classification Search
CPC ..................................................... H04L 9/14
See application file for complete search history.

(56) References Cited

U.S. PATENT DOCUMENTS

| 6,373,949 B1 * | 4/2002 | Aura | ..................... H04W 12/02 |
| | | | 455/410 |
| 8,966,262 B2 * | 2/2015 | Schell | ................... H04W 12/06 |
| | | | 726/28 |

(Continued)

FOREIGN PATENT DOCUMENTS

| WO | WO-2019068731 A1 * | 4/2019 | ............ H04W 12/06 |
| WO | 2019183794 A1 | 10/2019 | |

OTHER PUBLICATIONS

3GPP, "ETSI TS 133 501 V15.2.0", 5G; Security architecture and procedures for 5G System, as early as Oct. 1, 2018, 172 pages.

(Continued)

*Primary Examiner* — Yonas A Bayou
(74) *Attorney, Agent, or Firm* — Workman Nydegger

(57) ABSTRACT

A method in a secure element (SE), includes the following method steps: obtaining, in the SE, an identity query, in particular a GET IDENTITY command, sent by a network; encrypting, by means of the SE, identity data stored on the SE, in order to generate encrypted identity data using a symmetrical key generated in the SE before the obtaining step; applying, by means of the SE, a message authentication code (MAC) algorithm to the generated encrypted identity data in order to obtain a MAC; and creating and sending a response to the identity query from the SE to the network, wherein the message contains the encrypted identity data and the MAC. An SE is provided for a computer program product, and a system comprising a SE and a network.

20 Claims, 5 Drawing Sheets

(56) References Cited

U.S. PATENT DOCUMENTS

| | | | |
|---|---|---|---|
| 2003/0101345 A1* | 5/2003 | Nyberg ................. | H04W 12/06 |
| | | | 713/170 |
| 2011/0077002 A1* | 3/2011 | Dutta ................. | H04B 7/18563 |
| | | | 455/427 |
| 2014/0143826 A1* | 5/2014 | Sharp ...................... | H04L 63/20 |
| | | | 726/1 |
| 2017/0093565 A1* | 3/2017 | Yang ...................... | H04W 12/06 |
| 2018/0069699 A1* | 3/2018 | Bowman ................. | H04L 9/002 |
| 2018/0176778 A1* | 6/2018 | Amiel ................... | H04W 12/35 |
| 2021/0021993 A1* | 1/2021 | Yang ................. | H04W 12/0433 |

OTHER PUBLICATIONS

German Search Report from Corresponding German Patent Application No. DE102021004115.1, Apr. 12, 2022.
International Search Report from Corresponding PCT Application No. PCT/EP2022/025368, Nov. 18, 2022.

* cited by examiner

METHOD IN A SECURE ELEMENT

TECHNICAL FIELD OF THE INVENTION

The invention relates to methods in a secure element, SE, preferably a fifth-generation subscriber identity module, a corresponding SE, a computer program product and a corresponding system comprising an SE and a network.

To use services, a terminal, for example a mobile telephone or a machine-to-machine device, M2M-device for short, or a device for using Internet of Things technologies, IoT for short, contains an SE. The SE stores identity data (subscriber identity data, subscriber identifier, subscription) in order to uniquely identify and/or authenticate a subscriber (person or device) for the use of a service of a communication network or on a communication network. This allows an operator of the service or of the communication network to unambiguously assign the use of its offered service to each subscriber. Furthermore, it is possible for the operator of a communication network to enable network access, that is to say logging into the communication network, as soon as the subscriber has been authenticated. It may additionally deny network access if it is not possible to authenticate the subscriber.

TECHNICAL BACKGROUND

The world is mobile, and mobile networking is continuing to increase. Mobile communications-capable terminals communicate over mobile networks.

To use a mobile communications-capable terminal, such as a smartphone or mobile telephone, in a mobile network of a network operator, the terminal contains an SE that contains at least one subscription. By way of example, the subscription comprises a cryptographic authentication key, Ki, and unique identity data, such as an International Mobile Subscriber Identity, IMSI, or the Network Specific ID, NSI. The USIM application sets up, operates and disconnects connections of the terminal in the mobile network using the identity data.

In the standards for 2nd-generation to 4th-generation communication networks, the IMSI for logging the terminal into the communication network was interrogated by the network. In response thereto, the terminal or the SE transmits the IMSI in unencrypted form, that is to say in plain text, in a NAS message. This unencrypted IMSI constitutes a security problem, since what are known as IMSI catchers are able to intercept this IMSI in order to locate a position of the terminal or to analyze the behavior thereof.

To prevent IMSI catcher attacks, it has been defined, for the 5th-generation communication network, that all identity data for logging into the network must be transmitted in encrypted form, see for example ETSI TS 102 221 Version 15 or 3GPP TS 31.102 Version 15 or 3GPP TS 33.501 Version 15. In these 5G networks, the identity data (in particular IMSI, NSI) are referred to as a SUbscription Permanent Identifier, SUPI, and transmitted in the 5G network in encrypted form as a SUbscription Concealed Identifier, SUCI, see points 5.2.5 and 6.12 in 3GPP TS 33.501, Version 15.2.0.

For identification and authentication in the network, the network may make an identity query. This identity query must be answered within a short time frame, for example within 6 seconds. Within this time, the identity data have to be encrypted, in burdensome fashion, and transmitted to the network in response to the identity query.

Encrypting the SUPI to create a SUCI is computationally intensive and time-consuming, since provision is made for complex encryption algorithms, see for example fig. C.3.2.1 of 3GPP TS 33.501, Version 15.2.0. It has been found that this predefined time frame is limited and almost impossible to comply with in particular on the part of low-resource SEs (in particular with chips not having a crypto-co-processor and/or not having a multiplication accelerator). If the time frame is not complied with ("timeout"), the identity query is deemed not to have been answered, and a network login then cannot take place. Furthermore, it is specified that the PKI key pair used for encrypting the SUCI ought to be used only once and therefore ought to be regenerated upon each new query.

In one solution approach, higher-resource SEs are used, having for example a crypto-co-processor or a multiplication accelerator. These SEs are comparatively expensive.

In order to comply with this prescribed time frame, WO 2019/068731 A1 proposes to compute the SUCI in full beforehand and to store it in an SE. In response to a network identity query—obtained after the computation—this precomputed SUCI is loaded from the memory of the SE and used in a response to the identity query.

SUMMARY OF THE INVENTION

The invention is based on the object of providing a method in an SE in which the computing time taken to create and transmit a response to the identity query is able to be shortened, without the encrypted identity data required for this purpose being permanently stored beforehand. Higher-resource SEs (with corresponding cryptoprocessor arithmetic or multiplication acceleration) are intended to be dispensed with for cost reasons.

According to the invention, use is made of a method in a secure element, SE, comprising the following method steps: obtaining, in the SE, an identity query, in particular a GET IDENTITY command, transmitted by a network; encrypting, by means of the SE, identity data stored on the SE, in order to generate encrypted identity data using a symmetric key generated in the SE before the obtaining step; applying, by means of the SE, a message authentication code, MAC, algorithm to the generated encrypted identity data in order to obtain a MAC; and creating and transmitting a response to the identity query from the SE to the network, wherein the response contains the encrypted identity data and the MAC.

This method involves computing partial steps for obtaining a response to a network identity query beforehand, before obtaining an identity query, which are optionally stored (permanently or non-permanently) on the SE. If a network identity query is then obtained in the SE, only the last computing steps for computing the response are computed, based on the stored partial computing results.

This thus greatly reduces the computational complexity and therefore also the time required to create and transmit a response containing encrypted identity data when the identity query is obtained.

As a result, it is possible to operate much simpler and therefore also more cost-effective SEs in the 5G network, since a coprocessor for computing the SUCI is now no longer necessary in order to comply with the maximum time taken to respond to an identity query. By pre-computing keys, it is possible to comply with the 3GPP and ETSI specification, and the performance in terms of answering/processing an identity query can be significantly increased.

Optionally, in addition to the identity data and the MAC, the response message also contains the public key of the SE which was used for deriving the symmetric key, in particular the ECC ephemeral public key of the SE according to 3GPP TS 33.501. However, the public key SE may also be provided to the network in a different way.

The encryption step may correspond to the step "4. Symmetric Encryption" according to fig. C.3.2-1 of TS 33.501 V 15.2.0, with the difference that this symmetric key is already generated before the identity query is obtained. The result of the encryption step is for example the "cipher-text value" according to fig. C.3.2-1 of 3GPP TS 33.501, Version 15.2.0.

As input parameters for this encryption step, the identity data may be loaded from a memory of the SE. These identity data are unencrypted. By way of example, in a 5G network, the identity data are referred to as SUPI. The SUPI contains the IMSI or the NSI, which is used for identification in the 5G network. The (unencrypted) identity data constitute the data to be encrypted and consist at least of parts of the IMSI. The (unencrypted) identity data may correspond to the "plaintext block" according to fig. C.3.2-1 of 3GPP TS 33.501, Version 15.2.0.

The unencrypted identity data may be stored in at least one file of the SE, wherein the at least one file is preferably the file $EF_{IMSI}$ or $EF_{NSI}$ which includes an international mobile subscriber identifier, IMSI/NSI, wherein the response to the identity query preferably comprises a Subscription Concealed Identifier, SUCI.

The application step may correspond to the step "5. MAC Function" according to fig. C.3.2-1 of TS 33.501 V 15.2.0. A message authentication code, MAC for short, is used to obtain assurance about the origin of the identity data and to check the integrity thereof. The MAC algorithm requires the result of the encryption step and a secret key, for example the "Eph. Mac Key" according to fig. C.3.2-1 of TS 33.501 V 15.2.0, as input parameters and computes from both of them a checksum, the received MAC, for example the "MAC tag value" according to fig. C.3.2-1 of 3GPP TS 33.501, Version 15.2.0.

The symmetric key is a key of a symmetric cryptosystem in which, unlike an asymmetric cryptosystem, both subscribers, here SE and the network, use the same key to encrypt/decrypt messages/data.

The symmetric key may even be split before being used in the encryption step, for example into a first subkey that is used in the encryption step to generate the encrypted identity data and into a second subkey that is used in the application step to generate the MAC. This splitting may correspond to the step "3. Key Derivation" according to fig. C.3.2-1 of 3GPP TS 33.501, Version 15.2.0. The first subkey may be the "Eph. enc Key, ICB" according to fig. C.3.2-1 of 3GPP TS 33.501, Version 15.2.0. The second subkey may be the "Eph. mac Key" according to fig. C.3.2-1 of 3GPP TS 33.501, Version 15.2.0. A key length may be adjusted during this splitting.

The symmetric key generated before the identity query is obtained is taken from a memory area of the SE in order to perform the encryption step.

The generation may correspond to the step "2. Key Agreement" according to fig. C.3.2-1 of 3GPP TS 33.501 Version 15.2.0, with the difference that this symmetric key is already generated before the identity query is obtained. The generation may take place on the basis of elliptic curve keys, for example in accordance with an "Elliptic Curve Integrated Encryption Scheme, ECIES", for example in accordance with a Curve25519 algorithm according to RFC7748 or a secp256r1 algorithm according to the SEC-2 standard.

The symmetric key may be generated using a public key part of a cryptographic key pair of the network. This public key part is made available beforehand to the SE and may be a public key part of a network provider. This public key part may be made available to the SE during personalization of the SE.

The symmetric key may have been generated using a private key part of an SE-specific cryptographic key pair.

The generation of the symmetric key alone may take a certain amount of time in the SE, for example more than 1 second or more than 2 seconds or more than 3 seconds. Generating this symmetric key prior to obtaining the identity query from the network makes it possible to shorten the time taken to create and transmit the response to the network by this time taken to create the symmetric key, meaning that the identity query is able to be answered in timely fashion.

Preferably, the SE-specific cryptographic key pair is generated by the SE before the identity query is obtained. The SE-specific cryptographic key pair comprises the private key part (for generating the symmetric key) and a public key part. The public key part is preferably part of the response to the identity query and is integrated in the response in the creating and transmitting step. The public key part may be the "Eph. public key" according to fig. C.3.2-1 of 3GPP TS 33.501, Version 15.2.0.

This generation may correspond to step "1. Eph. key pair generation" according to fig. C.3.2-1 of 3GPP TS 33.501, Version 15.2.0, with the difference that this key pair is already generated before the identity query is obtained. The generation may take place on the basis of an elliptic curve encryption, for example in accordance with an "Elliptic Curve Integrated Encryption Scheme, ECIES", for example in accordance with a Curve25519 algorithm according to RFC7748 or a secp256r1 algorithm according to the SEC-2 standard. By way of example, the ECIES parameters may be found in Appendix C3.4 of 3GPP TS 33.501, Version 15.2.0.

The generation of the SE-specific cryptographic key pair alone may take a certain amount of time in the SE, for example more than 1 second or more than 2 seconds or more than 3 seconds. Generating this SE-specific cryptographic key pair prior to obtaining the identity query from the network makes it possible to shorten the time taken to create and transmit the response to the network by this time taken to create the SE-specific cryptographic key pair, meaning that the identity query is able to be answered in timely fashion.

Provision is made for either the generation of the symmetric key or the generation of the SE-specific cryptographic key pair, or the generation of the symmetric key and the generation of the SE-specific cryptographic key pair, to each already take place before the identity query is obtained by the SE from the network in the SE.

The generated symmetric key and/or the generated SE-specific cryptographic key pair is stored in a memory area of the SE and loaded from the memory area of the SE when the method is executed. The storage in the memory area of the SE may optionally be permanent (non-volatile) or volatile storage, and the memory area may accordingly be either a non-volatile memory, NVM, or a volatile memory, for example RAM.

The time of generation of the symmetric key and/or of the generated SE-specific cryptographic key pair may be immediately before the obtaining of the network identity query.

The time of generation of the symmetric key and/or generation of the SE-specific cryptographic key pair may be immediately before or after the transmission of a registration request to the network before the network identity query is obtained.

The time of generation of the symmetric key and/or generation of the SE-specific cryptographic key pair may be far in advance of the obtaining of the network identity query.

The symmetric key and/or the SE-specific cryptographic key pair may have been generated in the SE in response to a STATUS command or in response to a SELECT command.

Before the encrypting step, in a checking step by the SE a check may be made to establish whether the public key part of the cryptographic key pair of the network used for generating the symmetric key had been changed in the meantime, wherein the encrypting step is executed only if the public key part of the cryptographic key pair of the network had not been changed. This checking step is used to check whether the generated symmetric key is still up-to-date. A public key part of the cryptographic key pair of the network is used for generating this symmetric key. This public key part may be updated or changed in the life cycle of an SE. The previously generated symmetric key is invalid as of the time when the public key part of the cryptographic key pair of the network is changed/updated. A response to the network identity query generated with this invalid key would therefore likewise be invalid, since the response cannot be decrypted and the login to the network would fail. The checking step prevents this error. If a change in the public key part of the cryptographic key pair of the network is ascertained, the conventional method for generating the response to the identity query is executed. Depending on constraints, for example whether the underlying elliptic curve was maintained or was changed, some (private) keys may continue to be used, or all keys must be changed. In particular, the private key part of the SE-specific cryptographic key pair may possibly continue to be used.

The change in this key part concerns a period of time between the generation of the symmetric key and the encryption step.

The SE then no longer needs to have an encryption co-processor or a multiplication accelerator. This type of SE requires a particularly large time frame, for example more than 2 seconds or more than 3 seconds or more than 4 seconds or more than 5 seconds, to create and transmit a response according to the conventional method. Generating the symmetric key beforehand and/or generating the SE-specific cryptographic key pair beforehand makes it possible to significantly reduce this time frame, and thus prevent network rejections due to taking too much time to transmit a response to an identity query.

In a further aspect, the invention comprises a method in a Secure Element, SE, comprising the following method steps: generating an SE-specific cryptographic key pair in the SE on the basis of an ECC algorithm; generating a symmetric key using a private key part of the SE-specific cryptographic key pair and a public key part of a network key pair in the SE; obtaining an identity query, in particular a GET IDENTITY command, transmitted to the SE by a network only after the generating step for generating the SE-specific cryptographic key pair or after the generating step for generating the symmetric key; encrypting, by means of the SE, identity data stored on the SE, in order to generate encrypted identity data using the generated symmetric key; applying, by means of the SE, a message authentication code, MAC, algorithm to the generated encrypted identity data in order to obtain a MAC; and creating and transmitting a response to the identity query from the SE to the network, wherein the message contains the encrypted identity data and the MAC.

Generating the SE-specific cryptographic key pair in the SE and/or generating the symmetric key may be effected after obtaining a STATUS command or a SELECT command in the SE.

Generating the SE-specific cryptographic key pair in the SE and/or generating the symmetric key may be effected before transmitting a registration request to the network.

In a further aspect of the invention, provision is made for a secure element, preferably a fifth-generation subscriber identity module. The SE has: an interface, configured for obtaining an identity query, in particular a GET IDENTITY command, transmitted by a network; a non-volatile memory, configured for storing identity data, preferably in at least one file; and a control unit configured for: encrypting the stored identity data in order to generate encrypted identity data using a symmetric key generated before the identity query is obtained; applying a message authentication code, MAC, algorithm to the generated encrypted identity data in order to obtain a MAC; and creating and transmitting a response to the identity query from the SE to the network, wherein the message contains the encrypted identity data and the MAC.

The SE may furthermore comprise an operating system, stored executably in the non-volatile memory and configured, when it is executed in the control unit, to perform the method steps of the methods described above.

In a further aspect, a computer program product is installed executably in an SE, preferably a fifth-generation subscriber identity module, and has means for executing the method steps of the methods described above.

In a further aspect, provision is made for a system comprising an SE, preferably a fifth-generation subscriber identity module, and a network, wherein the system is configured for executing the method steps of the methods described above.

An SE, within the meaning of the invention, is an electronic module of reduced size and resource capabilities, having a control unit (microcontroller).

The term "SE" is synonymous with the term "UICC", "eUICC", "subscriber identity module", "chip card", "iUICC", "integrated eUICC", "integrated secure element", "embedded secure element", "secure element", or "SIM". The SE is for example a chip card or a SIM card or a subscriber identity module. The SE uses the machine-readable identity data stored in the secure non-volatile memory area to identify a subscriber in a communication network and to authenticate them for the use of services. SE also encompasses USIM, TSIM, ISIM, CSIM or R-UIM. By way of example, an SE is thus defined as a USIM application in ETSI TS 131 102. By way of example, an SE is thus defined as a SIM application in ETSI TS 151 011. By way of example, an SE is thus defined as a TSIM application according to ETSI TS 100 812. By way of example, an SE is thus defined as an ISIM application according to ETSI TS 131 103. By way of example, an SE is thus defined as a CSIM application according to 3GPP2 C.S0065-B. By way of example, an SE is thus defined as an R-UIM application according to 3GPP2 C.S0023-D.

The SE may be an integral component within the terminal, for example a hard-wired electronic module. Such SEs are also referred to as eUICCs. In this design, these SEs are not intended to be removed from the terminal, and cannot be easily replaced in principle. Such SEs may also be designed as embedded secure elements, and are a secure hardware component in the device.

The SE may also be a software component in a trusted part of an operating system, what is known as a trusted execution environment, TEE for short, of the terminal. By way of example, the SE is formed within a secure runtime environment in the form of programs running therein, what are known as "trustlets" or "trusted applications".

The SE may also be an integral part of a larger integrated circuit, for example of a modem or application processor. Such SEs are referred to as "integrated UICC", "integrated TRE", "integrated eUTCC" or "integrated SE". Such SEs are fixedly integrated into a SoC as an integrated processor block and are able to be connected via a bus internal to the chip. The SE has for example an internal or external secure non-volatile memory area in which the identity data are securely inserted in order to prevent tampering and/or mis-use attempts during identification and/or authentication on the network.

In one embodiment. the SE may be operable by way of a terminal, wherein the SE, in this embodiment, is autono-mous except for supply signals, such as supply voltage, clock cycle, reset, etc. The SE may then have an interface (data interface) for communication with the terminal, into which the SE is inserted, possibly ready for operation. This communication preferably takes place via a connection protocol, in particular a protocol according to the ETSI TS 102 221 or ISO-7816 standard.

The term "terminal" is preferably used here, since the terminal may primarily be a terminal in communication technology. This does not rule out the "terminal" being a "device" in another technology. The terms "terminal" and "device" are used synonymously here.

The SE may be used for remote monitoring, inspection and maintenance of devices such as machines, installations and systems. It may be used for metering units such as electricity meters, hot water meters, etc. The SE for example forms part of IoT technology.

A terminal, within the meaning of the invention, is in principle a device or a device component having means for communication with a communication network in order to be able to use services of the communication network or to be able to use services of a server via a gateway of the communication network. By way of example, the term may encompass a mobile device such as a smartphone, a tablet PC, a notebook or a PDA. By way of example, the terminal may also be understood to mean multimedia devices such as digital picture frames, audio devices, televisions or e-book readers, which likewise have means for communication with the communication network.

In particular, the terminal is installed in a machine, an automaton and/or a vehicle. If the terminal is installed in a motor vehicle, it has an SE integrated therein, for example. The SE may establish a data connection to a server via the communication network by way of the terminal, for example a modem of the terminal. By way of example, the terminal may be used to contact a server of the terminal manufacturer in order to address control units, for example ECUs (ECU=electronic control unit) for functionalities of the terminal. The UICC may be used to contact a server in the background system of the mobile network operator, MNO, for example a server for loading updates for software, firmware and/or the operating system of the SE into the SE.

In addition to smartphones and mobile telephones, mobile communications-capable terminals also include regulation devices (control devices or measuring devices or combined control/measuring devices) for industrial facilities in the commercial or private sphere. Industrial facilities are for example production installations that have one or more regulation devices (terminals) that are able to communicate with a background system or/and with one another via a mobile network. Other industrial facilities include smart home facilities such as heaters or power consumers having terminals in the form of regulation devices.

By way of example, a command may be an instruction or an order transmitted by the device. The command is pref-erably a command according to the ETSI TS 102 221 or ISO/IEC 7816 standard. In one preferred embodiment, com-mands in the form of APDU commands are received in the UICC. An APDU is a combined command/data block of a connection protocol between the UICC and the device. The structure of the APDU is defined by the ISO-7816-4 stan-dard. APDUs constitute an information element on the application layer (layer 7 of the OSI layer model).

The SE is preferably a fifth-generation USIM, also referred to as "5G USIM". A subscriber may thus be identified according to the 5G standard.

In a further preferred embodiment, the at least one file is the $EF_{IMSI}$, which includes an international mobile sub-scriber identity, IMSI. It is important to protect this IMSI, and—if possible—it should not be transmitted to the termi-nal or in the network in plain text. In a 5G network, the IMSI is not exchanged in plain text between the SE and the communication network.

In a further preferred embodiment, the at least one file is the file $EF_{NSI}$, which contains a permanent subscriber iden-tifier, or "Subscription Permanent Identifier", SUPI for short. It is important to protect this SUPI, and—if possible— it should not be transmitted to the terminal or in the network in plain text. This SUPI in $EF_{NSI}$ is preferably not the IMSI. This SUPI may be a Network Access Identifier, NAI for short, as defined in the 3GPP TS 23.003 standard.

In a further preferred embodiment, the at least one file is the file $EF_{Routing\ Identicator}$, which includes a routing indica-tor for computing the SUCI. Using this parameter, a terminal or the SE is able to perform the method according to the invention and, as a result, create a SUCI and transmit it to the network. This file $EF_{Routing\ Identifier}$ contains the routing indicator, which, together with an MCC and an MNC, makes it possible to forward network signaling with SUCI to AUSF and UDM instances that are able to serve the subscriber, as defined in the 3GPP TS 23.003 standard.

By way of example, a Subscription Permanent Identifier, SUPI for short, is used as identity data in the 5G network. The SUPI is defined in the 3GPP specification TS 23.501. A valid SUPI may in this case be an IMSI or a Network Access Identifier, NAI for short, as defined in RFC 4282 in con-junction with 3GPP TS 23.003. The SUPI may then be converted into a Subscription Concealed Identifier, SUCI for short (encrypted SUPI), using the 5G USIM. The SUCI is a privacy-protecting network identifier that contains the SUPI concealed therein. The 5G USIM generates a SUCI using this method described here and using this ECIES-based protection scheme set forth above with the previously gen-erated symmetric key. The IMSI (which is part of the SUPI) is then sent in encrypted form as a SUCI in response to the network identity query.

In addition, identity data are for example data that uniquely authenticate a subscriber on the communication network, for example an authentication algorithm, specific algorithm parameters, a cryptographic authentication key Ki and/or a cryptographic over-the-air key, OTA key for short. In addition, identity data are for example data that uniquely authenticate a subscriber to a service, for example a unique identifier or signature. A service is in particular a voice service or a data service of a server by way of which information and/or data are transmitted over the communication network.

A communication network (the network) is a technical facility on which signals are transmitted so as to identify and/or authenticate the subscriber. The communication network provides its own services (its own voice and data services) and/or allows the use of services from external instances. The communication network is preferably a mobile network. Device-to-device communication under the supervision of the communication network is possible here. In particular a 5th-generation "5G" mobile network is understood here to be a communication network.

BRIEF DESCRIPTION OF THE FIGURES

The invention and further embodiments and advantages of the invention are explained in more detail below with reference to figures, wherein the figures merely describe exemplary embodiments of the invention. The same components in the figures are provided with the same reference signs. The figures should not be considered to be true to scale; individual elements of the figures may be illustrated so as to be overly large or overly simplified. Optional elements are illustrated using dashed lines.

DETAILED DESCRIPTION OF EXEMPLARY EMBODIMENTS

Figure 1:
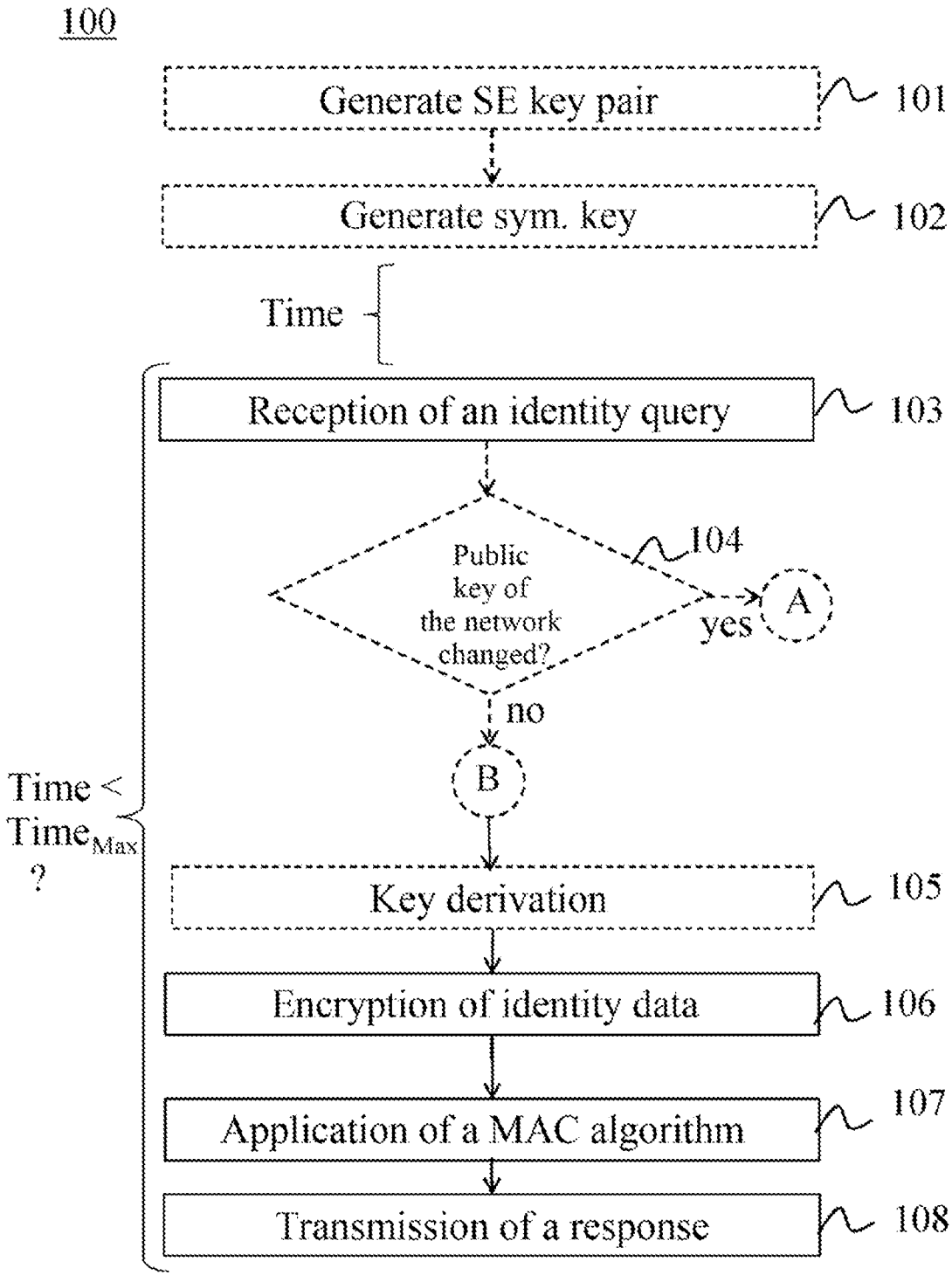
FIG. 1 shows a flowchart of a method according to the invention in an SE.
Figure 2:
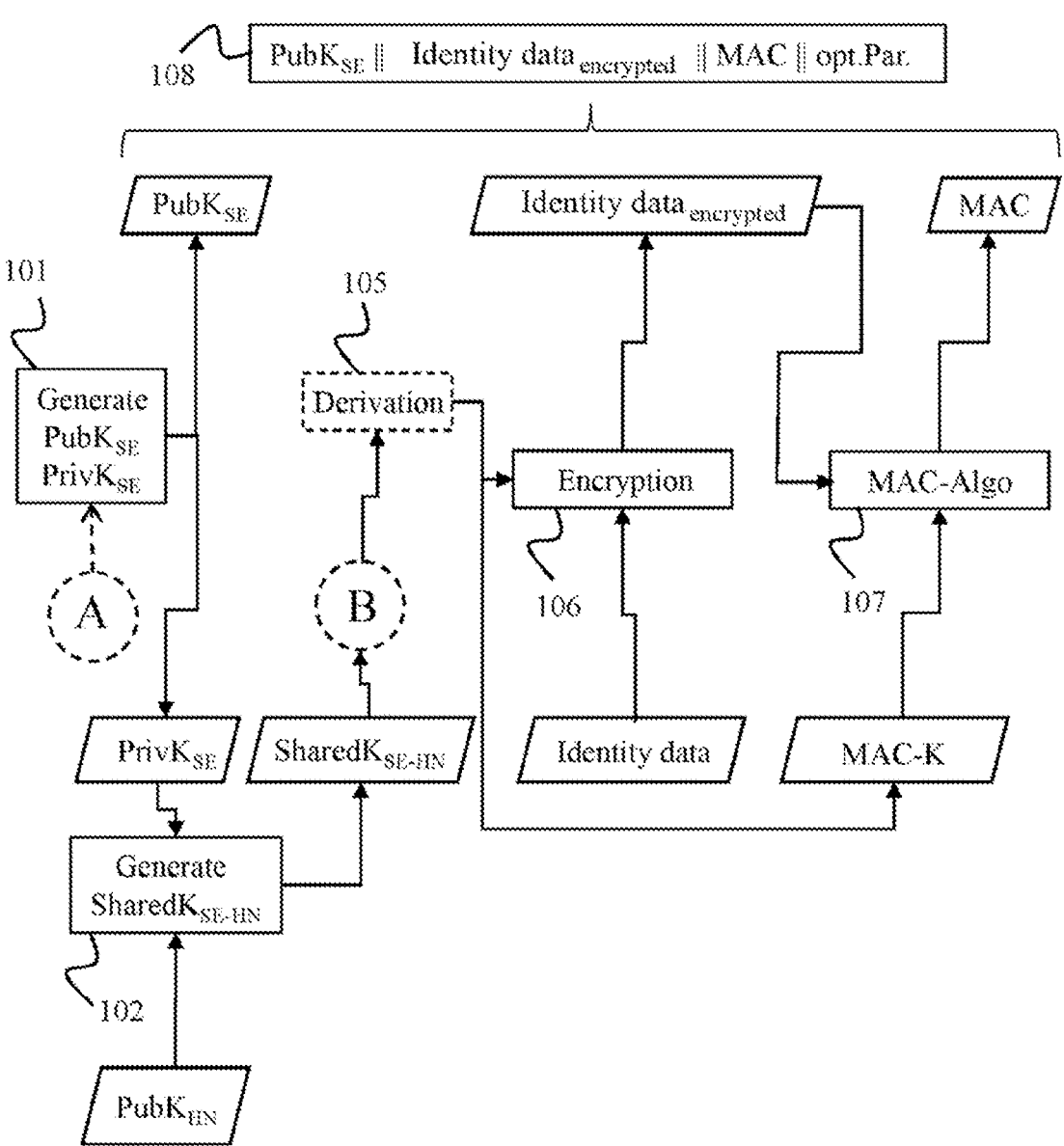
FIG. 2 shows a flowchart of a method according to the invention in an SE.
Figure 4:
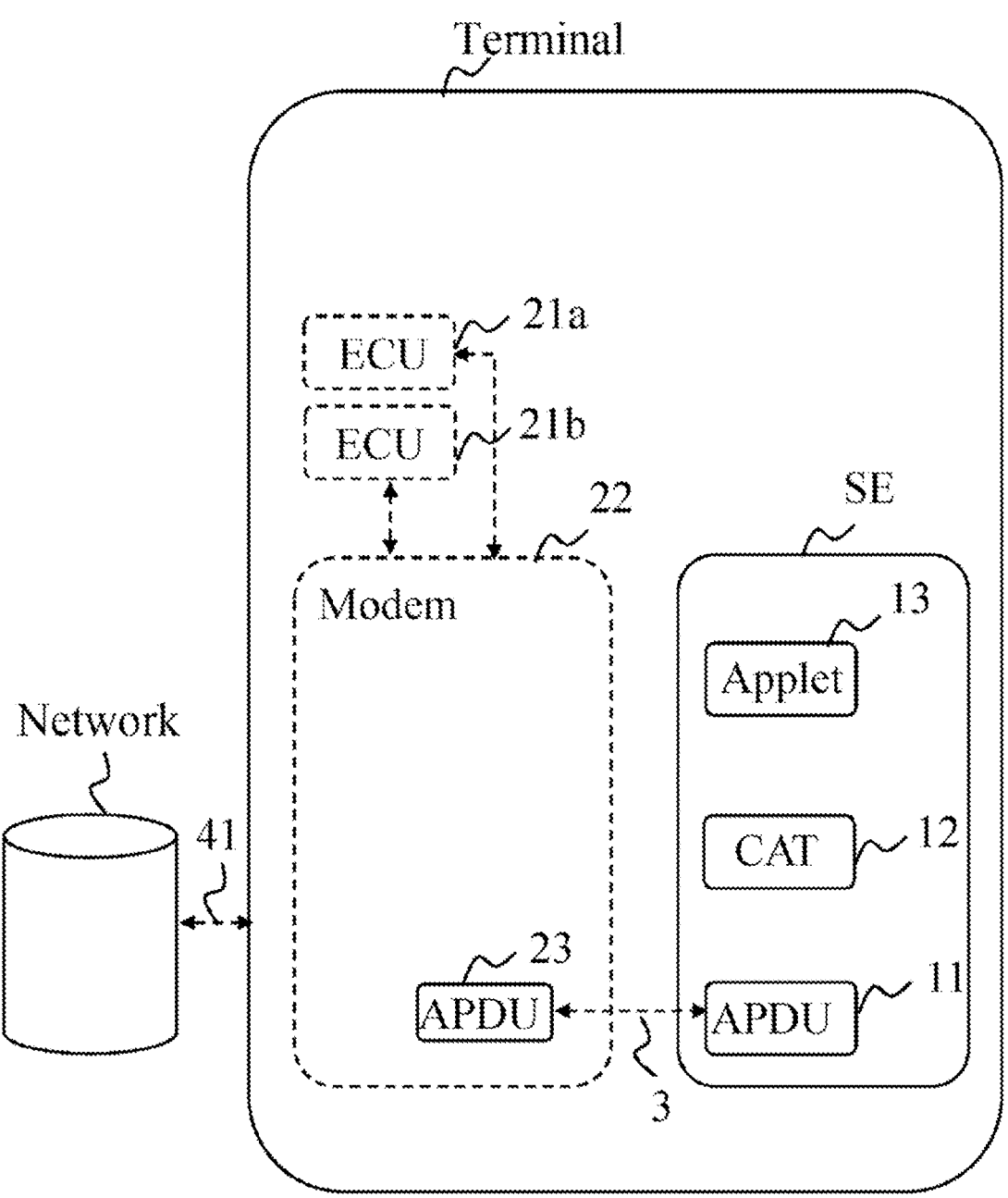
FIG. 4 shows one exemplary embodiment of a system consisting of a device having an SE and a network.
Figure 5:
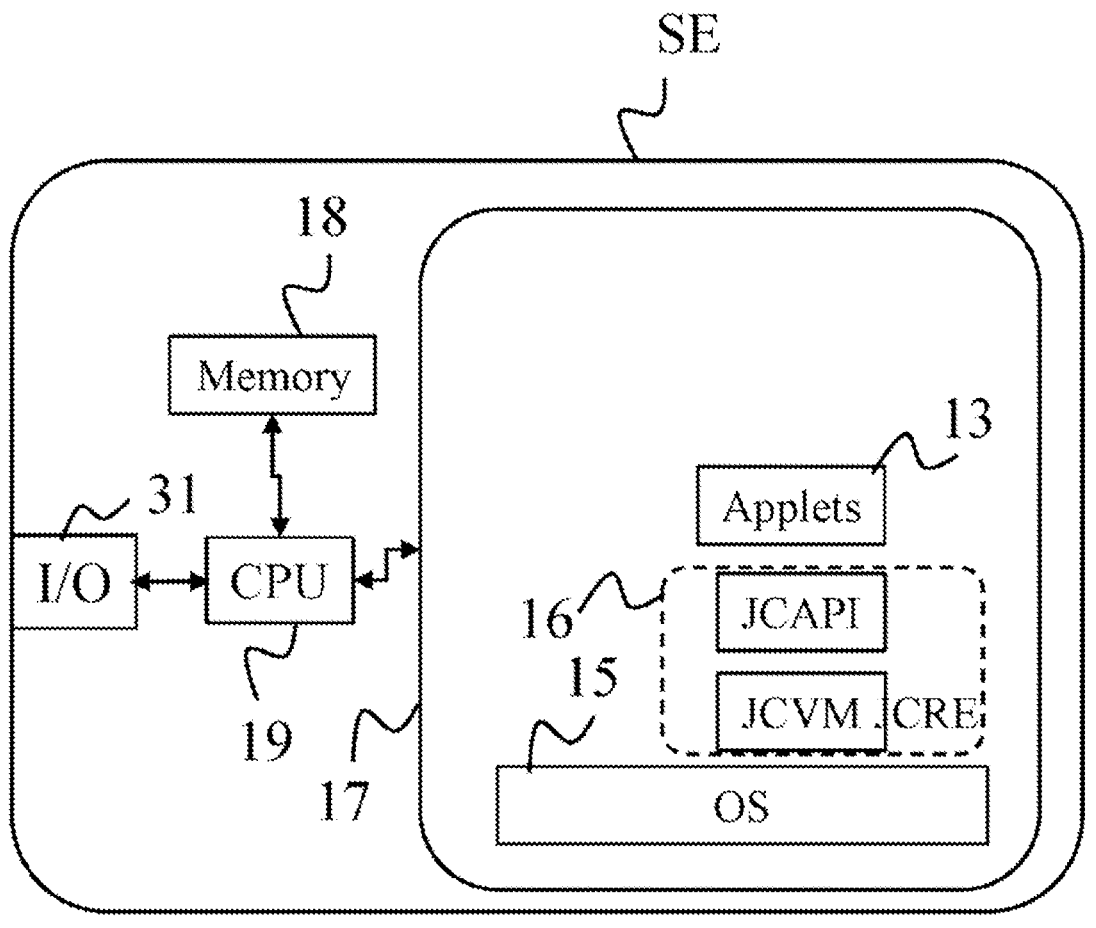
FIG. 5 shows one exemplary embodiment of an SE.

FIGS. 1 and 2 each show an exemplary embodiment of a flowchart of a method 100 according to the invention in an SE from FIGS. 4 and 5. FIGS. 1 and 2 are described together below. FIG. 2 corresponds to a simplified version of fig. C.3.2-1 of 3GPP TS 33.501 in Version 15.2.0 and shows upon implementing the method at point (A) the conventional method (simplified in step "Generate PubK$_{SE}$ PrivK$_{SE}$" 101), and upon implementing the method at point (B) a preferred variant of the method according to the invention (likewise simplified in step "Derivation" 105).

In step 101, an SE-specific cryptographic key pair PubK$_{SE}$, PrivK$_{SE}$ is generated in the SE on the basis of an ECC algorithm. By way of example, a Curve25519/X25519 algorithm is used. An ECIES profile parameter used in Appendix C3.4 of the 3GG TS 33.501 standard may be used. As a result of step 101, a private key part PrivK$_{SE}$ of the SE-specific cryptographic key pair was generated. This step may correspond to the step "1. Eph key pair generation" of the sequential method according to fig. C.3.2-1.

The SE-specific cryptographic key pair PubK$_{SE}$, PrivK$_{SE}$ depends only on the type of encryption that is to be used. This type is predefined by a public key part PubK$_{HN}$ of a cryptographic key pair of a network. This public key part PubK$_{HN}$ is known to the SE before step 101 is executed.

In an SE without a crypto-coprocessor or without a multiplication accelerator, this step may take up to 3 seconds, see tables 1 to 6.

FIG. 1 does not illustrate a storage step, for storing the SE-specific cryptographic key pair PubK$_{SE}$, PrivK$_{SE}$ in a memory area of the SE for later use.

The public part PubK$_{SE}$ is sent to the network as part of a response 108 to a network identity query.

In the subsequent step 102, a symmetric key SharedK$_{SE-HN}$ is generated in the SE. This symmetric key SharedK$_{SE-HN}$ is generated using the public key part PrivK$_{SE}$, generated in step 101, of the SE-specific cryptographic key pair and a public key part PubK$_{HN}$ of a cryptographic key pair of a network. The public key part PubK$_{HN}$ is present in the SE and may already be stored in the memory of the SE when the SE is personalized. This step may correspond to the step "2. Key agreement" of the sequential method according to fig. C.3.2-1. In an SE without a crypto-coprocessor or without a multiplication accelerator, this step may take up to 3 seconds, see tables 1 to 6.

FIG. 1 does not illustrate a storage step, for storing the symmetric key SharedK$_{SE-HN}$ in a memory area of the SE for later use.

In a subsequent step 103 (shown in FIG. 1, but not shown in FIG. 2), an identity query in the context of a GET IDENTITY command is received in the SE. There may be a relatively long period of time "Time" between step 102 and step 103; steps 101/102 may be temporally uncorrelated with step 103. The invention provides for at least one of the two steps 101 and 102 (both of steps 101, 102 in FIG. 1) to have already been carried out before step 103 of obtaining the identity query, in order to shorten the period of time for generating a response to the identity query.

In the optional step 104 (shown in FIG. 1, but not shown in FIG. 2) a check is made to establish whether the public key part PubK$_{HN}$ used in the generating step 102 had been changed in the meantime. If it is ascertained during the checking 104 that the public key part PubK$_{HN}$ used in the generating step 102 had been changed in the meantime (update, parameter adaptation, replacement) (yes case), then step "Generate SharedK$_{SE-HN}$ 102" is executed again. If even the type of encryption has changed (switching from Curve25519 to secp256r1 or vice versa), then the conventional method for generating a response to the identity query is carried out, as is illustrated starting from the point "A" in FIG. 2.

If it is ascertained during the checking 104 that the public key part PubK$_{HN}$ used in the generating step 102 had not been changed in the meantime (update, parameter adaptation, replacement) (no case), then the method according to the invention for generating a response to the identity query is carried out further, as is illustrated starting from the point "B" in FIGS. 1 and 2.

Steps 101 and 102 are illustrated using dashed lines in FIG. 1 since in each case only one of the two steps 101, 102 needs to be executed before step 103, in order not to exceed a maximum period of time Time$_{max}$ between identity query and response. Reference is made to the time values in tables 1 to 6. The latter compare the times required to create the response 108 (response to GET IDENTITY) with/without pre-computed keys. They also present the influence of the pre-computation in step 101, step 102 and both steps 101+102.

In the optional step 105, a first subkey and a second subkey are derived from the symmetric key SharedK$_{SE-HN}$. This step 105 may correspond to the step "3. Key derivation" according to fig. C.3.2-1 of 3GPP TS 33.501, Version 15.2.0. The first subkey may be the "Eph. enc Key, ICB" according to fig. C.3.2-1 of 3GPP TS 33.501, Version 15.2.0. The second subkey may be the "Eph. mac Key" according to fig. C.3.2-1 of 3GPP TS 33.501, Version 15.2.0. A key length may also be adjusted during this splitting 105.

In step 106, identity data stored in the SE are encrypted. File contents of the file EF$_{IMSI}$ are used as input data for the encryption 106. This encryption 106 may correspond to the step "4. Symmetric Encryption" according to fig. C.3.2-1 of 3GPP TS 33.501, Version 15.2.0. As a result of this step, encrypted identity data are obtained. The encrypted identity data from step 106 are (also) sent to the network as part of a response to an identity query from the network.

In step 107, a MAC algorithm is applied. The encrypted identity data from step 106 are used here as an input parameter for the MAC algorithm. In addition, the second subkey "Eph. mac Key" may be used as another input parameter for the MAC algorithm. This application 107 may be the step "5. MAC function" according to fig. C.3.2-1 of 3GPP TS 33.501, Version 15.2.0. As a result of this step 107, a MAC is obtained, which may also be referred to as "MAC-tag value" according to fig. C.3.2-1 of 3GPP TS 33.501, Version 15.2.0. The MAC from step 107 is (also) sent to the network as part of a response to an identity query from the network.

Step 108 involves creating and transmitting a response to the network identity query. By way of example, this A few comparisons of the computing of the SUCI on various SEs are illustrated below, from which the effect of the time saving from the advance computation of steps 101 and/or 102 becomes apparent.

Table 1 illustrates an SE without a crypto-coprocessor and without a multiplication accelerator, with hardware AES (Advanced Encryption Standard), SC000 architecture for computing a Profile A (Curve25519) with IMSI SUCI computation. Step 101 already requires 1100 milliseconds, and step 102 requires 1101 milliseconds. If the GET IDENTITY command is executed with pre-computed keys after steps 101 and 102, only 23 milliseconds are required. If the GET IDENTITY command is executed (only) with a pre-computed key after step 101, only 1120 milliseconds are required. If the GET IDENTITY command is executed without pre-computed keys after step 101 or 102, 2217 milliseconds are required. In other words, the method presented provides almost 100 times faster creation of a response to the GET IDENTITY command if steps 101 and 102 are computed in advance and the corresponding keys are loaded from the memory of the SE. In other words, the method presented provides almost twice as fast creation of a response to the GET IDENTITY command if the step is computed in advance and the key pair is loaded from the memory of the SE.

TABLE 1

| Computation with SE with SC000 architecture with HW-AES | | |
|---|---|---|
| SC000 with HW-AES Profile A | Time in ms | Remarks |
| Step 101 (pubK SE + privK SE) | 1100 | Step 101 during a preceding STATUS or SELECT command |
| Step 102 (Shared K SE-HN) | 1101 | Step 102 during a preceding STATUS or SELECT command |
| GET IDENTITY with pre-computed PubK SE + PrivK SE + Shared K SE-HN | 23 | Step 101 and step 102 before the GET IDENTITY command |
| GET IDENTITY with pre-computed PubK SE + PrivK SE | 1120 | Step 102 only after GET IDENTITY command |
| GET IDENTITY without pre-computed PubK SE + PrivK SE + Shared K SE-HN | 2217 | Conventional GET IDENTITY command processing | response comprises a concatenation of the public part PubK$_{SE}$ (step 101), the encrypted identity data (step 106) and the MAC (step 107). Additional parameters may likewise be contained in the response.

> Response=PubK$_{SE}$||Identity data$_{encrypted}$||MAC||optional parameters

This response 108 is preferably the result of the GET IDENTITY command.

In particular, the ETSI TS 102 221 standard, Version 15 and higher, and the 3GPP TS 31.102 standard, Version 15 and higher, define the GET IDENTITY command. This command is used in 5G networks to generate a SUCI. The SUCI context includes an IMSI (International Mobile Subscription ID) or NSI (Network specific ID) as the identity data used to identify a subscriber in a 5G network.

The GET IDENTIY command is transmitted by the network and must be answered within six seconds, including the transmission time. This is a major problem for SEs that do not have a crypto-coprocessor or a multiplication accelerator.

Table 2 illustrates an SE "without a crypto-coprocessor, without a multiplication accelerator, with hardware AES, SC000 architecture" for computing a Profile B (secp256r1) with an IMSI SUCI calculation. Step 101 already requires 2934 milliseconds, and step 102 requires 2938 milliseconds. If the GET IDENTITY command is executed with pre-computed keys after steps 101 and 102, only 23 milliseconds are required. If the GET IDENTITY command is executed (only) with a pre-computed key after step 101, only 2957 milliseconds are required. If the GET IDENTITY command is executed without pre-computed keys after step 101 or 102, 5884 milliseconds are required. In other words, the method presented provides almost 250 times faster creation of a response to the GET IDENTITY command if steps 101 and 102 are computed in advance and the corresponding keys are loaded from the memory of the SE. In other words, the method presented provides almost twice as fast creation of a response to the GET IDENTITY command if the step is computed in advance and the key pair is loaded from the memory of the SE.

TABLE 2

| Computation with SE with SC000 architecture with HW-AES | | |
| --- | --- | --- |
| SC000 with HW-AES Profile B | Time in ms | Remarks |
| Step 101 (pubK SE + privK SE) | 2934 | Step 101 during a preceding STATUS or SELECT command |
| Step 102 (Shared K SE-HN) | 2938 | Step 102 during a preceding STATUS or SELECT command |
| GET IDENTITY with pre-computed PubK SE + PrivK SE + Shared K SE-HN | 23 | Step 101 and step 102 before the GET IDENTITY command |
| GET IDENTITY with pre-computed PubK SE + PrivK SE | 2957 | Step 102 only after GET IDENTITY command |
| GET IDENTITY without pre-computed PubK SE + PrivK SE + Shared K SE-HN | 5884 | Conventional GET IDENTITY command processing |

Table 3 illustrates an SE "without a crypto-coprocessor, SC300 architecture (includes a multiplication accelerator)" for computing a Profile A (Curve25519) with an IMSI SUCI calculation. Step 101 already requires 119 milliseconds, and step 102 requires 96 milliseconds. If the GET IDENTITY command is executed with pre-computed keys after steps 101 and 102, only 23 milliseconds are required. If the GET IDENTITY command is executed (only) with a pre-computed key after step 101, only 117 milliseconds are required. If the GET IDENTITY command is executed without pre-computed keys after step 101 or 102, 234 milliseconds are required. In other words, the method presented provides almost 10 times faster creation of a response to the GET IDENTITY command if steps 101 and 102 are computed in advance and the corresponding keys are loaded from the memory of the SE. In other words, the method presented provides almost twice as fast creation of a response to the GET IDENTITY command if the step is computed in advance and the key pair is loaded from the memory of the SE.

TABLE 3

| Computation with SE with SC300 architecture | | |
| --- | --- | --- |
| SC300 Profile A | Time in ms | Remarks |
| Step 101 (pubK SE + privK SE) | 119 | Step 101 during a preceding STATUS or SELECT command |
| Step 102 (Shared K SE-HN) | 96 | Step 102 during a preceding STATUS or SELECT command |
| GET IDENTITY with pre-computed PubK SE + PrivK SE + Shared K SE-HN | 23 | Step 101 and step 102 before the GET IDENTITY command |
| GET IDENTITY with pre-computed PubK SE + PrivK SE | 117 | Step 102 only after GET IDENTITY command |
| GET IDENTITY without pre-computed PubK SE + PrivK SE + Shared K SE-HN | 234 | Conventional GET IDENTITY command processing |

Table 4 illustrates an SE "without a crypto-coprocessor, SC300 architecture (includes a multiplication accelerator)" for computing a Profile B (secp256r1) with an IMSI SUCI calculation. Step 101 already requires 424 milliseconds, and step 102 requires 406 milliseconds. If the GET IDENTITY command is executed with pre-computed keys after steps 101 and 102, only 23 milliseconds are required. If the GET IDENTITY command is executed (only) with a pre-computed key after step 101, only 427 milliseconds are required. If the GET IDENTITY command is executed without pre-computed keys after step 101 or 102, 848 milliseconds are required. In other words, the method presented provides almost 40 times faster creation of a response to the GET IDENTITY command if steps 101 and 102 are computed in advance and the corresponding keys are loaded from the memory of the SE. In other words, the method presented provides almost twice as fast creation of a response to the GET IDENTITY command if the step is computed in advance and the key pair is loaded from the memory of the SE.

TABLE 4

| Computation with SE with SC300 architecture | | |
|---|---|---|
| SC300 Profile B | Time in ms | Remarks |
| Step 101 (pubK SE + privK SE) | 424 | Step 101 during a preceding STATUS or SELECT command |
| Step 102 (Shared K SE-HN) | 406 | Step 102 during a preceding STATUS or SELECT command |
| GET IDENTITY with pre-computed PubK SE + PrivK SE + Shared K SE-HN | 23 | Step 101 and step 102 before the GET IDENTITY command |
| GET IDENTITY with pre-computed PubK SE + PrivK SE | 427 | Step 102 only after GET IDENTITY command |
| GET IDENTITY without pre-computed PubK SE + PrivK SE + Shared K SE-HN | 848 | Conventional GET IDENTITY command processing |

Table 5 illustrates an SE without a crypto-coprocessor and without a multiplication accelerator, without hardware AES, SC000 architecture for computing a Profile A. If the GET IDENTITY command is executed with pre-computed keys after steps 101 and 102, only 38 milliseconds are required. If the GET IDENTITY command is executed (only) with a pre-computed key after step 101, only 1303 milliseconds are required. If the GET IDENTITY command is executed without pre-computed keys after step 101 or 102, 2606 milliseconds are required. In other words, the method presented provides almost 70 times faster creation of a response to the GET IDENTITY command if steps 101 and 102 are computed in advance and the corresponding keys are loaded from the memory of the SE. In other words, the method presented provides almost twice as fast creation of a response to the GET IDENTITY command if the step is computed in advance and the key pair is loaded from the memory of the SE.

TABLE 5

| Computation with SE with SC000 architecture without HW-AES | | |
|---|---|---|
| SC000 without HW-AES Profile A | Time in ms | Remarks |
| GET IDENTITY with pre-computed PubK SE + PrivK SE + Shared K SE-HN | 38 | Step 101 and step 102 before the GET IDENTITY command |
| GET IDENTITY with pre-computed PubK SE + PrivK SE | 1303 | Step 102 only after GET IDENTITY command |
| GET IDENTITY without pre-computed PubK SE + PrivK SE + Shared K SE-HN | 2606 | Conventional GET IDENTITY command processing |

Table 6 illustrates an SE without a crypto-coprocessor and without a multiplication accelerator, without hardware AES, SC000 architecture for computing a Profile A. If the GET IDENTITY command is executed with pre-computed keys after steps 101 and 102, only 38 milliseconds are required. If the GET IDENTITY command is executed (only) with a pre-computed key after step 101, only 3251 milliseconds are required. If the GET IDENTITY command is executed without pre-computed keys after step 101 or 102, 6464 milliseconds are required. In other words, the method presented provides 280 times faster creation of a response to the GET IDENTITY command if steps 101 and 102 are computed in advance and the corresponding keys are loaded from the memory of the SE. In other words, the method presented provides almost twice as fast creation of a response to the GET IDENTITY command if the step is computed in advance and the key pair is loaded from the memory of the SE.

end, the network checks the identity of the terminal and asks it for authentication/identification. The sequence of a registration request and authentication/identification request is described in principle in 3GPP TS 23.501. During the identification, the network transmits an identification query to the terminal. This is converted into a GET IDENTITY command in the terminal and forwarded to the SE. In the 5G network, the SE is then forced to convert the identity data, which are referred to as SUPI and comprise for example the IMSI, NSI, NAI, into a SUCI and send this back to the network within a period of time $time_{MAX}$ (for example 6 seconds).

An IMSI is part of a subscriber identifier and should—if possible—not be read. The UICC 1 is a 5G USIM and is therefore configured to generate a SUCI based on the IMSI. It is advantageous to use the SUCI instead of the IMSI since, when transmitting the SUCI, the MSIN part of the IMSI is not transmitted to the terminal or the network in plain text.

TABLE 6

| Computation with SC000 without HW-AES | | |
| --- | --- | --- |
| SC000 without HW-AES Profile B | Time in ms | Remarks |
| GET IDENTITY with pre-computed PubK SE + PrivK SE + Shared K SE-HN | 38 | Step 101 and step 102 before the GET IDENTITY command |
| GET IDENTITY with pre-computed PubK SE + PrivK SE | 3251 | Step 102 only after GET IDENTITY command |
| GET IDENTITY without pre-computed PubK SE + PrivK SE + Shared K SE-HN | 6464 | Conventional GET IDENTITY command processing |

The measured times are exemplary values which, of course, are dependent on various factors, such as e.g. voltage classes, frequencies and implementation of the respective cryptographic functions. It is thus possible to derive only a temporal behavior with respect to one another but not an exact computation duration for specific cases.

It is possible to achieve a significant increase in speed with the aid of the pre-computing in step 101 or additional preliminary generation of the symmetric key in step 102.

As a result, it is possible to operate much simpler and therefore also more cost-effective SE cards in the 5G network, since a co-processor is no longer necessary to compute the SUCI in order to comply with the maximum time $time_{MAX}$. By pre-computing keys, it is possible to comply with the 3GPP and ETSI specification, and the performance in terms of answering/processing a GET IDENTITY command can be significantly increased.

The identity query is for example an APDU command of a terminal in FIG. 4, in which the SE is introduced and by means of which the SE creates a SUCI. The identity query need not have been originally initiated by the terminal; there may be a request that was brought to the terminal by the network (FIG. 4) via the communication interface 41. By way of example, a network identifier is queried. By way of example, personal data stored in the SE are queried.

The SUCI computation in the 5G USIM functionality as defined in ETSI TS 102.221, as of Version 15, and 3GPP TS 31.102, as of Version 15, should be supported by the SE.

Figure 3:
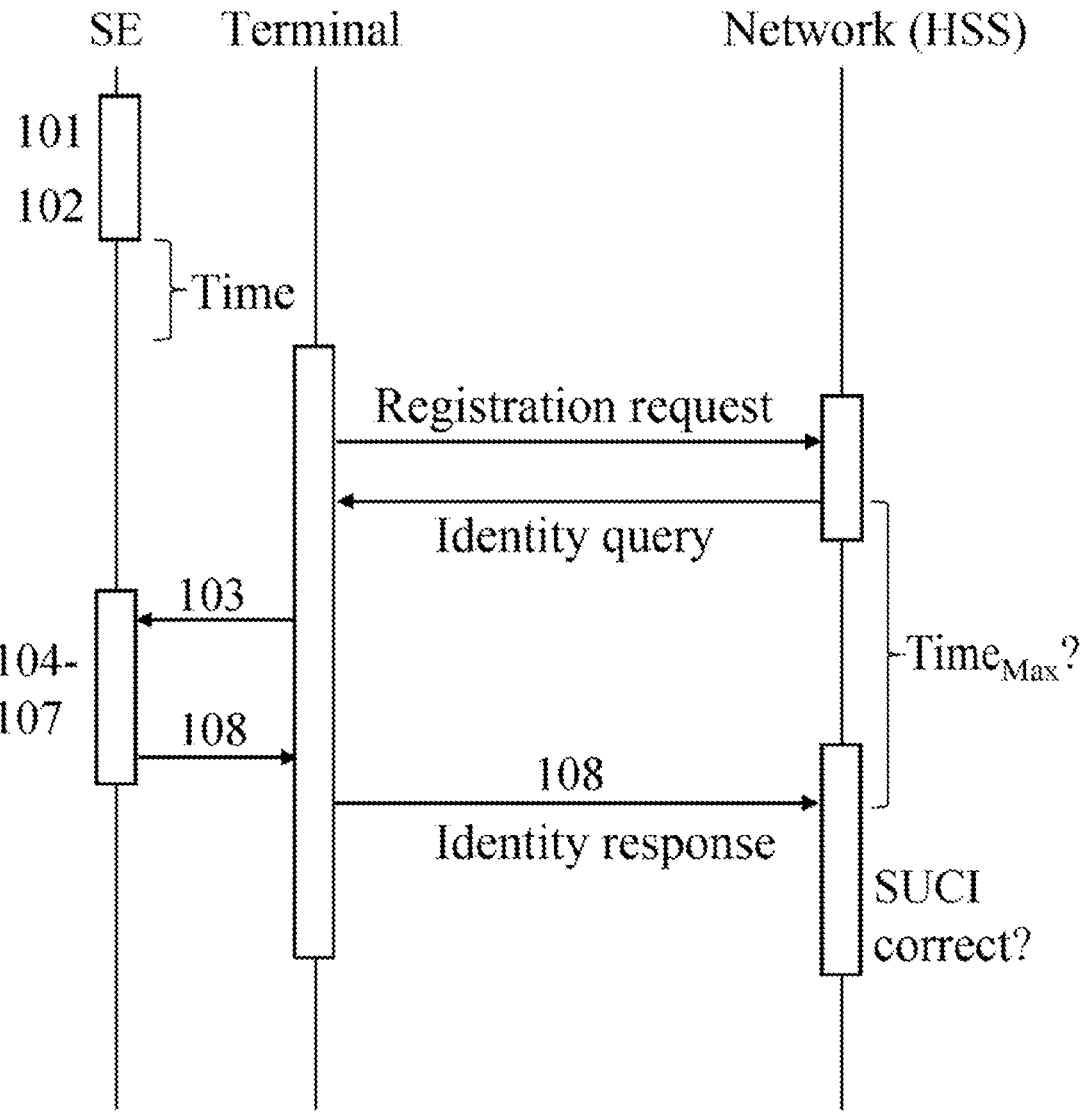
FIG. 3 shows a flowchart of a method according to the invention between an SE, a device and a network.

FIG. 3 then describes a flowchart of a preferred exemplary embodiment for carrying out the method 100 according to the invention. Method steps 101 to 108 correspond to method steps 101 to 108 from FIG. 1 or FIG. 2. The SE in FIG. 3 is a 5G USIM.

After step 102, the terminal sends a registration request to the network. This registration request is intended to enable the terminal to be able to use services of the network. To this Transmitting the SUCI would accordingly protect the security-relevant and/or personal information from the file $EF_{IMSI}$, so as to transmit the SUCI instead of the IMSI as network identifier.

In order to transmit a SUCI as response to the identity query instead of an IMSI, the SUCI has to be computed. To this end, the method in FIGS. 1 and 2 with steps 101 to 108 is applied. This computing may correspond to the standardized procedures according to 3GPP 23.501 and is substantially improved according to the invention by the advance computation in steps 101 and 102 in order to avoid time-consuming computations after step 103.

The subscriber identification mechanism according to the 5G network makes it possible to identify a terminal on the over-the-air radio interface (interface 41 in FIG. 4) with the aid of the generated SUCI. When the terminal attempts to register for the first time, the SE encrypts the SUPI into a SUCI on the basis of the GET IDENTITY command and makes this SUCI available to the terminal in step 108.

The SUCI here is a data protection-friendly identifier that contains the concealed SUPI. Reference is made to FIGS. 1 and 2. The SE generates in steps 101 and 102 using the ECIES-based protection scheme with the public key of the home network $PubK_{HN}$, which was made available securely to the SE during USIM registration or during personalization.

Only the MSIN part of the SUPI is encrypted, while the home network identifier, that is to say MCC/MNC, continues to be transmitted in plain text. The data fields that make up the SUCI are "SUPI Type"; "Home Network Identifier" (for IMSI=MCC+MNC, for NAI=Domain Name); "Routing Indicator"; "Identifier of the protection scheme: Null Scheme or Profile A or Profile B"; "Home network public key $PubK_{HN}$ identifier"; "Variable-length or hexadecimal character string, depending on the protection scheme used."

The method 100 is integrated here in an operating system 15 of the SE, and may thus be employed and used in any native SE.

FIG. 4 shows one exemplary embodiment of a system consisting of a terminal and an SE, in which the method from FIGS. 1 and 2 takes place. By way of example, the terminal is an M2M device in an IoT environment. The terminal may have a plurality of ECUs 21; two ECUs 21a and 21b are shown as a representation here. These ECUs 21 control the functionalities of the terminal.

The SE is inserted into the terminal ready for operation and is supplied with a supply voltage Vcc and a clock cycle CLK by the terminal. The SE is illustrated in more detail in FIG. 5. FIG. 4 indicates that the SE has applets 13. These applets 13 are able to transmit different APDU commands 11 to the terminal via a Card Application Toolkit, CAT, 12.

The terminal also comprises a modem 22. By way of example, the modem 22 may be considered a logic unit for converting data between the SE and a network 4. The terminal may set up a communication connection 3 to the SE via the modem 22. The communication 3 between the terminal and the SE takes place for example in accordance with the protocols defined in the international ISO/IEC 7816-3 and ISO/IEC 7816-4 standards, to which reference is hereby expressly made.

The entire data exchange between SE and the terminal preferably takes place using what are known as APDUs (Application Protocol Data Units) according to the ISO/IEC 7816-4 standard. An APDU constitutes a data unit on the application layer, that is to say a kind of container using which commands and/or data are transmitted to the SE. A distinction is made between command APDUs transmitted from a terminal to the SE and response APDUs transmitted from the SE to the terminal in response to a command APDU.

In this case, the modem 22 is a communication unit of the terminal, in order also to exchange data from the terminal or the SE via a communication interface 41 with the network, for example a server of a network operator. The data exchanged between the SE and the modem 22 may be converted into an IP-based connection protocol in the modem 22.

FIG. 5 shows a block diagram of an SE according to the invention, preferably a hard-wired eUICC. As an alternative, the SE is a portable data carrier with a different design. The SE has an operating system 15 in which the method 100 according to FIGS. 1 and 2 takes place. By way of example, the operating system 15 is a native operating system. It is also conceivable for the operating system 15 to be configured to operate a Java Card runtime environment, JCRE, 16.

The SE is designed to exchange data with the terminal according to FIG. 4. For data transmission and communication between the SE and the terminal, both the SE and the terminal each have suitable communication interfaces 31. The interfaces may be designed for example such that the communication between them or between the SE and the terminal is connected galvanically, that is to say with contact. The contact assignment is defined in ISO/IEC 7816. In one embodiment, not illustrated, the communication interface is contactless, for example in accordance with an RFID or NFC or WLAN standard. The terminal may forward a network identity query to the SE (step 103 of the method 100 in FIG. 1 or FIG. 2).

The SE additionally has a central processor or control unit, CPU 19, which has a communication connection to the interface 31. The primary tasks of the CPU 19 include executing arithmetic and logic functions and accessing (reading, writing, changing, overwriting, creating and/or deleting) files in the SE, as defined by program code executed by the CPU 19. The files are for example elementary files, EF, in a file directory, Directory Files, DF, of a root directory or a profile directory of the SE of a non-volatile memory 17. The CPU 19 is also connected to a volatile working memory, RAM 18, and the non-volatile rewritable memory 17. The non-volatile memory 17 is preferably a flash memory (flash EEPROM). By way of example, it may be a flash memory with a NAND or NOR architecture. The control unit 19 is additionally configured to execute steps 101 to 108 of the method from FIGS. 1 and 2 when corresponding program code is executed.

In the preferred embodiment illustrated in FIG. 5, the program code is stored in the non-volatile memory 17 and is able to be executed by the CPU 19. In particular, the non-volatile memory 17 may store the program code of the chip card operating system, OS, 15, of the Java Card runtime environment, JCRE, 16 (consisting of Java Card Virtual Machine, JCVM and Java Card Application Programming Interfaces, JCAPI), application 13. The application 13 here is preferably present in the form of Java Card™ applets. In addition, the CAT 12 shown in FIG. 4 is incorporated in accordance with ETSI TS 102 223.

Modern terminals, such as smartphones, contain a chipset, which may comprise a plurality of chips or processors, in particular an application processor, a baseband processor, and optionally a specially secured secure processing unit SPU (none of which are illustrated in FIGS. 1 and 2). For the future 5G mobile communication standard currently under development, the concept of the integrated UICC, iUICC, is being proposed, in which the functionality of a USIM card or of a UICC is integrated in a manner distributed in the chipset, that is to say in one or more chips or processors, of the terminal. It is highly advantageous in terms of costs if this chipset does not have a cryptoprocessor or hardware accelerator, which is made possible by the present method.

Within the scope of the invention, all of the elements described and/or shown and/or claimed may be combined with one another as desired.

The invention claimed is:

1. A method in a secure element (SE) comprising the following method steps:
   obtaining, in the SE, an identity query, including a GET IDENTITY command, transmitted by a network;
   encrypting, by means of the SE, identity data stored on the SE, in order to generate encrypted identity data using a symmetric key generated in the SE before the obtaining step;
   applying, by means of the SE, a message authentication code (MAC) algorithm to the generated encrypted identity data in order to obtain a MAC; and
   creating and transmitting a response to the identity query from the SE to the network, wherein the response contains the encrypted identity data and the MAC.

2. The method according to claim 1, wherein the symmetric key was generated using a public key part of a cryptographic key pair of the network.

3. The method according to claim 2, wherein before the encrypting step in a checking step by the SE a check is made to establish whether the public key part of the cryptographic key pair of the network used for generating the symmetric key had been changed in the meantime,
   wherein the encrypting step was executed only if the public key part of the cryptographic key pair of the network had not been changed.

4. The method according to claim 1, wherein the symmetric key was generated using a private key part of an SE-specific cryptographic key pair.

5. The method according to claim 4, wherein the SE-specific cryptographic key pair was generated by the SE before obtaining the identity query.

6. The method according to claim 1, wherein the symmetric key and/or the SE-specific cryptographic key pair had already been generated before or after transmission of a registration request of the SE to the network.

7. The method according to claim 5, wherein the SE-specific cryptographic key pair was generated on the basis of an elliptic-curve cryptography (ECC) algorithm.

8. The method according to claim 1, wherein the SE does not have an encryption co-processor, nor a multiplication accelerator.

9. The method according to claim 1, wherein the identity data are stored in at least one file of the SE.

10. The method according to claim 9, wherein the at least one file is an elementary file (EF) which includes an International Mobile Subscriber Identifier (IMSI) and/or a Network Specific Identifier (NSI).

11. The method according to claim 9, wherein the response to the identity query comprises a Subscription Concealed Identifier (SUCI).

12. A method in a secure element (SE) comprising the following method steps:

generating an SE-specific cryptographic key pair in the SE on the basis of an elliptic-curve cryptography (ECC) algorithm;

generating a symmetric key using a private key part of the SE-specific cryptographic key pair and a public key part of a network key pair in the SE;

obtaining an identity query transmitted to the SE by a network only after the generating step for generating the SE-specific cryptographic key pair or after the generating step for generating the symmetric key;

encrypting, by means of the SE, identity data stored on the SE, in order to generate encrypted identity data using the generated symmetric key;

applying, by means of the SE, a message authentication code (MAC) algorithm to the generated encrypted identity data in order to obtain a MAC, transmitting a response to the identity query from the SE to the network, wherein the response contains the encrypted identity data and the MAC.

13. The method according to claim 12, wherein generating the SE-specific cryptographic key pair in the SE and/or generating the symmetric key are/is effected after obtaining a STATUS command or a SELECT command in the SE.

14. The method according to claim 12, wherein generating the SE-specific cryptographic key pair in the SE and/or generating the symmetric key are/is effected before transmitting a registration request to the network.

15. The method according to claim 12, wherein the identity query comprises a GET IDENTITY command.

16. A secure element (SE) having:

an interface, configured for obtaining an identity query transmitted by a network;

a non-volatile memory, configured for storing identity data; and a control unit, configured for:

encrypting the stored identity data in order to generate encrypted identity data using a symmetric key generated before obtaining the identity query;

applying a message authentication code (MAC) algorithm to the generated encrypted identity data in order to obtain a MAC; and creating and transmitting a response to the identity query from the SE to the network, wherein the response contains the encrypted identity data and the MAC.

17. The SE according to claim 16, furthermore comprising:

an operating system, stored executably in the non-volatile memory and configured, when it is executed in the control unit, to perform the steps of a method in a SE, comprising the following method steps:

obtaining, in the SE, an identity query, including a GET IDENTITY command, transmitted by a network;

encrypting, by means of the SE, identity data stored on the SE, in order to generate encrypted identity data using a symmetric key generated in the SE before the obtaining step;

applying, by means of the SE, a MAC algorithm to the generated encrypted identity data in order to obtain a MAC; and creating and transmitting a response to the identity query from the SE to the network, wherein the response contains the encrypted identity data and the MAC.

18. The SE according to claim 16, wherein the identity query comprises a GET IDENTITY command.

19. A computer program product installed executably in a non-transitory SE and having means for executing the method steps of the method according to claim 1.

20. A system comprising an SE and a network, wherein the system is configured for executing the method steps of the method according to claim 1.

* * * * *